United States Patent
Lewis et al.

(10) Patent No.: US 11,170,067 B2
(45) Date of Patent: Nov. 9, 2021

(54) METHODS, SYSTEMS, AND MEDIA FOR UPDATING A WEBPAGE RENDERED WITH CACHED CONTENT

(71) Applicant: Google LLC, Mountain View, CA (US)

(72) Inventors: Justin Lewis, South San Francisco, CA (US); Richard Rapp, Marina Del Rey, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/840,560

(22) Filed: Dec. 13, 2017

(65) Prior Publication Data
US 2019/0179919 A1    Jun. 13, 2019

(51) Int. Cl.
| | |
|---|---|
| G06F 16/958 | (2019.01) |
| G06F 9/54 | (2006.01) |
| G06F 16/957 | (2019.01) |
| G06F 40/186 | (2020.01) |
| H04L 29/06 | (2006.01) |

(52) U.S. Cl.
CPC ............ *G06F 16/958* (2019.01); *G06F 9/547* (2013.01); *G06F 16/957* (2019.01); *G06F 16/9574* (2019.01); *G06F 16/9577* (2019.01); *G06F 40/186* (2020.01); *H04L 67/40* (2013.01)

(58) Field of Classification Search
CPC ............... G06F 16/9574; G06F 16/957; G06F 16/9577; G06F 17/248
See application file for complete search history.

(56) References Cited

U.S. PATENT DOCUMENTS

| | | | |
|---|---|---|---|
| 6,934,697 B1 | 8/2005 | Warren | |
| 7,296,051 B1 * | 11/2007 | Kasriel | ............... G06F 16/9574 709/203 |
| 7,594,001 B1 | 9/2009 | Ebbo et al. | |

(Continued)

FOREIGN PATENT DOCUMENTS

| | | |
|---|---|---|
| WO | WO 2014134234 | 9/2014 |
| WO | WO 2017035026 | 3/2017 |
| WO | WO 2017160377 | 9/2017 |

OTHER PUBLICATIONS

International Search Report and Written Opinion dated Nov. 15, 2018 in International Patent Application No. PCT/US2018/051073.

(Continued)

*Primary Examiner* — Scott T Baderman
*Assistant Examiner* — Benjamin Smith
(74) *Attorney, Agent, or Firm* — Byrne Poh LLP

(57) ABSTRACT

Methods, systems, and media for updating a webpage rendered with cached content are provided. In some embodiments, the method comprises: receiving, at a user device, a request to present a webpage; retrieving, from memory local to the user device, a template associated with the webpage and a plurality of content items to be included in the webpage; causing the webpage to be presented on the user device using the retrieved template and the one or more content items; transmitting a Remote Procedure Call (RPC) to a server associated with the webpage, wherein the RPC includes an identifier of the webpage; receiving a response to the RPC that includes at least one update to the webpage; and causing the webpage to be updated based on the response to the RPC.

21 Claims, 5 Drawing Sheets

(56) References Cited

U.S. PATENT DOCUMENTS

| | | | | |
|---|---|---|---|---|
| 7,694,294 B2* | 4/2010 | Bukovec | | G06F 8/60 |
| | | | | 709/219 |
| 7,881,984 B2* | 2/2011 | Kane, Jr. | | G06Q 30/02 |
| | | | | 705/26.7 |
| 7,974,888 B2* | 7/2011 | Kane, Jr. | | G06Q 30/02 |
| | | | | 705/26.7 |
| 8,260,845 B1* | 9/2012 | Colton | | G06F 8/30 |
| | | | | 709/203 |
| 8,370,420 B1 | 2/2013 | Decasper et al. | | |
| 8,595,754 B2* | 11/2013 | Van Doorn | | G06F 9/547 |
| | | | | 719/330 |
| 9,160,800 B1* | 10/2015 | Lunt | | H04L 67/16 |
| 9,294,553 B1 | 3/2016 | Vaswani et al. | | |
| 10,200,427 B2* | 2/2019 | Cabanillas | | H04L 67/2842 |
| 10,574,692 B2* | 2/2020 | Drake | | H04W 12/02 |
| 2003/0093585 A1* | 5/2003 | Allan | | H04L 67/02 |
| | | | | 719/330 |
| 2006/0212792 A1* | 9/2006 | White | | G06F 16/958 |
| | | | | 715/205 |
| 2006/0251125 A1* | 11/2006 | Goring | | H04L 67/26 |
| | | | | 370/503 |
| 2008/0183672 A1* | 7/2008 | Canon | | G06F 16/9577 |
| 2008/0243631 A1* | 10/2008 | Kane | | G06Q 30/0631 |
| | | | | 705/14.5 |
| 2008/0243632 A1* | 10/2008 | Kane | | G06Q 30/02 |
| | | | | 705/14.66 |
| 2008/0244614 A1* | 10/2008 | Van Doorn | | G06F 9/542 |
| | | | | 719/313 |
| 2009/0144753 A1* | 6/2009 | Morris | | G06F 40/169 |
| | | | | 719/318 |
| 2009/0172005 A1* | 7/2009 | LaToza | | G06F 40/186 |
| 2009/0210631 A1* | 8/2009 | Bosworth | | G06F 12/0875 |
| | | | | 711/141 |
| 2009/0300656 A1* | 12/2009 | Bosworth | | H04L 67/10 |
| | | | | 719/320 |
| 2011/0202270 A1* | 8/2011 | Sharma | | G06Q 30/0241 |
| | | | | 701/533 |
| 2011/0213681 A1* | 9/2011 | Shahid | | G06Q 30/0641 |
| | | | | 705/27.1 |
| 2012/0005326 A1* | 1/2012 | Bradetich | | G05B 19/4185 |
| | | | | 709/223 |
| 2012/0110435 A1 | 5/2012 | Green | | |
| 2013/0041986 A1* | 2/2013 | Colton | | G06F 8/30 |
| | | | | 709/219 |
| 2014/0033019 A1 | 1/2014 | Zixiao et al. | | |
| 2014/0236756 A1* | 8/2014 | Bourke | | G06Q 30/0631 |
| | | | | 705/26.7 |
| 2014/0280770 A1* | 9/2014 | Burckart | | H04L 67/2823 |
| | | | | 709/219 |
| 2015/0019958 A1* | 1/2015 | Ying | | G06F 17/211 |
| | | | | 715/243 |
| 2015/0089352 A1* | 3/2015 | Conboy | | G06F 16/9574 |
| | | | | 715/234 |
| 2015/0200988 A1* | 7/2015 | Cabanillas | | H04L 65/4084 |
| | | | | 709/203 |
| 2015/0378579 A1* | 12/2015 | Kaplinger | | G06F 16/958 |
| | | | | 715/745 |
| 2016/0124918 A1* | 5/2016 | Ying | | G06F 16/9535 |
| | | | | 715/234 |
| 2016/0335243 A1* | 11/2016 | Zhai | | G06F 17/248 |
| 2017/0034300 A1 | 2/2017 | Santhosh | | |
| 2017/0177699 A1* | 6/2017 | Chan | | G06F 16/986 |
| 2017/0346851 A1* | 11/2017 | Drake | | H04W 12/02 |
| 2018/0047052 A1 | 2/2018 | Owens | | H04L 67/02 |
| 2018/0260195 A1* | 9/2018 | Govindaraj | | G06F 8/38 |

OTHER PUBLICATIONS

Examination Report dated May 24, 2021 in IN Patent Application No. 201947048760, 7 Pages.
Examination Report dated Jul. 22, 2021 in EP Patent Application No. 18792578.9. 8 pages.

* cited by examiner

METHODS, SYSTEMS, AND MEDIA FOR UPDATING A WEBPAGE RENDERED WITH CACHED CONTENT

TECHNICAL FIELD

The disclosed subject matter relates to methods, systems, and media for updating a webpage rendered with cached content.

BACKGROUND

Users frequently view content presented in user interfaces that can be rendered using templates. For example, a homepage for a video sharing service may be rendered using a template that indicates a portion of the user interface that is to display a title, a portion of the user interface that is to display indications of popular video content items, a portion of the user interface that is to display recommended video content items, etc. Rendering a webpage on a user device using templates and cached content (e.g., cached graphics, text, etc.) can cause the webpage to be rendered with reduced latency. However, rendering a webpage using templates and cached content can make it difficult for a server of the content to personalize content on the webpage. Continuing with the example above of a homepage for a video sharing service, it can be difficult for a server associated with the video sharing service to present up-to-date recommendations for a particular user when the webpage is rendered with a template and cached content, because content associated with a recommended video content item (e.g., a thumbnail image, a title, graphics, icons, etc.) may not already be cached on the user device.

Accordingly, it is desirable to provide new methods, systems, and media for updating a webpage rendered with cached content.

SUMMARY

Methods, systems, and media for updating a webpage rendered with cached content are provided.

In accordance with some embodiments of the disclosed subject matter, a method for updating webpage content is provided, the method comprising: receiving, at a user device, a request to present a webpage; retrieving, from memory local to the user device, a template associated with the webpage and a plurality of content items to be included in the webpage; causing the webpage to be presented on the user device using the retrieved template and the one or more content items; transmitting a Remote Procedure Call (RPC) to a server associated with the webpage, wherein the RPC includes an identifier of the webpage; receiving a response to the RPC that includes at least one update to the webpage; and causing the webpage to be updated based on the response to the RPC.

In some embodiments, the at least one update to the webpage includes a content item not included in the plurality of content items.

In some embodiments, at least one content item in the plurality of content items is a recommendation to view a media content item.

In some embodiments, the RPC includes identifiers corresponding to each of the content items in the one or more content items.

In some embodiments, the method further comprises: detecting that a content item of the plurality of content items has been interacted with on the user device; and transmitting a second RPC to the server that indicates that the content item of the plurality of content items has been interacted with.

In some embodiments, the second RPC includes timing information of the interaction with the content item of the plurality of content items.

In some embodiments, the template indicates a location for each content item in the plurality of content items.

In accordance with some embodiments of the disclosed subject matter, a system for updating webpage content is provided, the system comprising a memory and a hardware processor that, when executing computer-executable instructions stored in the memory, is configured to: receive, at a user device, a request to present a webpage; retrieve, from memory local to the user device, a template associated with the webpage and a plurality of content items to be included in the webpage; cause the webpage to be presented on the user device using the retrieved template and the one or more content items; transmit a Remote Procedure Call (RPC) to a server associated with the webpage, wherein the RPC includes an identifier of the webpage; receive a response to the RPC that includes at least one update to the webpage; and cause the webpage to be updated based on the response to the RPC.

In accordance with some embodiments of the disclosed subject matter, a non-transitory computer-readable medium containing computer-executable instructions that, when executed by a processor, cause the processor to perform a method for updating webpage content is provided, the method comprising: receiving, at a user device, a request to present a webpage; retrieving, from memory local to the user device, a template associated with the webpage and a plurality of content items to be included in the webpage; causing the webpage to be presented on the user device using the retrieved template and the one or more content items; transmitting a Remote Procedure Call (RPC) to a server associated with the webpage, wherein the RPC includes an identifier of the webpage; receiving a response to the RPC that includes at least one update to the webpage; and causing the webpage to be updated based on the response to the RPC.

In accordance with some embodiments of the disclosed subject matter, a system for updating webpage content is provided, the system comprising: means for receiving, at a user device, a request to present a webpage; means for retrieving, from memory local to the user device, a template associated with the webpage and a plurality of content items to be included in the webpage; means for causing the webpage to be presented on the user device using the retrieved template and the one or more content items; means for transmitting a Remote Procedure Call (RPC) to a server associated with the webpage, wherein the RPC includes an identifier of the webpage; means for receiving a response to the RPC that includes at least one update to the webpage; and means for causing the webpage to be updated based on the response to the RPC.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
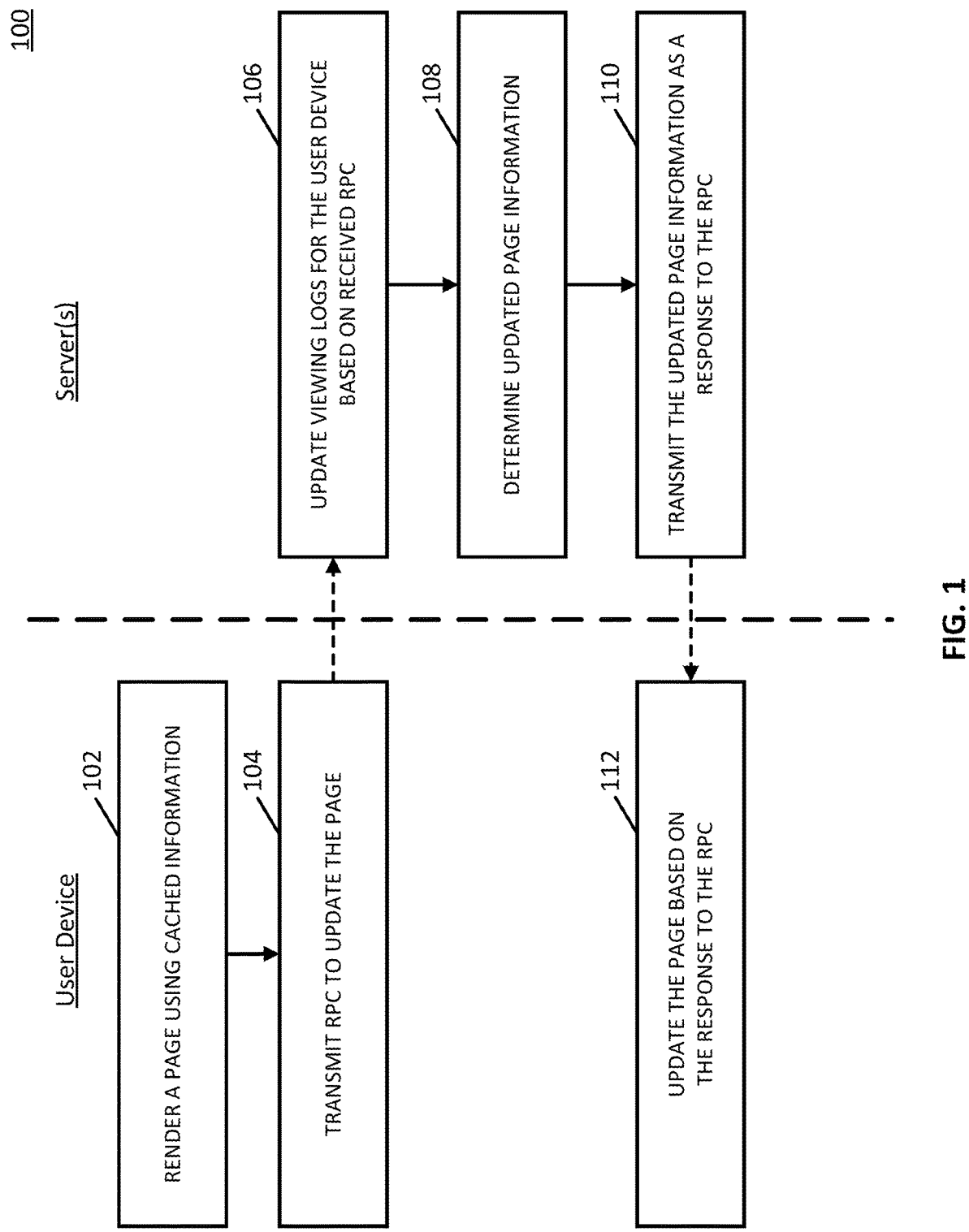
FIG. 1 shows an example of an information flow diagram for updating webpage content in accordance with some embodiments of the disclosed subject matter.

In accordance with various embodiments, mechanisms (which can include methods, systems, and media) for updating a webpage rendered with cached content are provided.

In some embodiments, the mechanisms described herein can cause a user device to render a webpage using a template and cached content. For example, in some embodiments, the user device can use a template associated with a particular type of webpage (e.g., a homepage for a video sharing service or social networking service, a webpage for presenting a video content item, a webpage for allowing a user to create a playlist of video content items, a webpage associated with a particular channel of video content, and/or any other suitable type of webpage) and cached content, such as graphics, thumbnail images, and/or any other suitable type of content that has previously been stored on the user device to render the webpage. The user device can then transmit information indicating the rendered webpage to a server, which can identify updates to the rendered webpage based on the received information. For example, in some embodiments, the server can identify video content items that are to be recommended to a user of the user device based on a webpage that is currently being rendered, an advertisement that is to be presented within the webpage, and/or any other suitable updated content. In some embodiments, the server can then transmit the updated information to the user device. The user device can then update the rendered webpage using the updated information received from the server.

In some embodiments, the user device can transmit information indicating the rendered webpage and/or content items included in the rendered webpage to a server using a Remote Procedure Call (RPC). For example, in some embodiments, the RPC can include an identifier of the webpage being rendered on the user device. As another example, in some embodiments, in instances where the webpage being rendered on the user device includes a recommended content portion, the RPC can include identifiers of video content items that are currently included in the recommended content portion. In some embodiments, the user device can update the rendered webpage based on a response to the RPC from the server. For example, in some embodiments, the response can include additional video content items to be included in a recommended content portion, an advertisement that is to be included in the web page, a tag or banner indicating that a particular video content item indicated in the webpage has already been watched by a user of the user device, and/or any other suitable response that indicates updates to be made to the webpage. In some embodiments, the RPC can be a non-blocking RPC, thereby allowing the user device to continue performing any suitable actions, and to continue rendering the webpage, while waiting for the response to the RPC from the server.

In some embodiments, the user device can additionally transmit an RPC to the server in response to determining that a particular content item included in the webpage has been viewed and/or interacted with. For example, in some embodiments, the user device can transmit an RPC to the server indicating that a particular content item has become visible (e.g., as a result of a user of the user device scrolling to make the particular content item visible). As another example, in some embodiments, the user device can transmit an RPC to the server indicating that a particular content item has been selected on the user device. As yet another example, in some embodiments, the user device can transmit an RPC to the server indicating that a particular content item has been endorsed by a user of the user device. In some such embodiments, the server can determine updates to the webpage based on the interactions with the content items on the webpage, as described below in more detail in connection with FIG. 3.

In some embodiments, the mechanisms described herein can allow the user device to render a webpage with a relatively reduced latency by using cached templates and cached content. Additionally, by transmitting indications to a server of webpages that are being rendered and content items that have been presented, viewed, and/or interacted with concurrently while presenting the webpage, the mechanisms described herein can allow the server to provide personalized updates to the webpage while the user device is presenting the webpage. Furthermore, in some embodiments, by receiving information indicating the webpage and/or content items being presented by the user device, in some embodiments, the server can determine webpages and/or content items likely to be presented on the user device in the near future, and can transmit (e.g., as a response to an RPC), to the user device, content to be stored locally on the user device. The user device can then use the locally stored content when the page determined to be likely to be viewed in the future is requested, thereby further reducing latencies for providing requested content, as described below in more detail in connection with FIG. 3.

Turning to FIG. 1, an illustrative example 100 of an information flow diagram for updating a webpage rendered with cached content is shown in accordance with some embodiments of the disclosed subject matter. As illustrated, blocks of process 100 can be executed on a user device and on a server.

At 102, the user device can render a webpage using cached information. In some embodiments, the webpage can be any suitable type of webpage, such as a webpage that presents indications of available content. As a more particular example, in some embodiments, the webpage can be a webpage that presents a feed of available media content, a webpage that presents recommendations for media content, a webpage that includes a video player window for presenting a particular video, and/or any other suitable type of content. In some embodiments, the webpage can be rendered in any suitable manner, such as within an application executing on the user device.

In some embodiments, the cached information can include any suitable content and/or information related to the webpage. For example, in some embodiments, the cached information can include a template for rendering a particular type of webpage corresponding to the webpage. As a more particular example, in some embodiments, the particular type of webpage can be a homepage for a particular video sharing service or social networking service, a webpage for presenting recommendations for media content, a webpage that includes a video player window for presenting a video, and/or any other suitable type of webpage. As another example, in some embodiments, the cached information can include information related to objects that are to be presented within the webpage. As a more particular example, in instances where the webpage is to include a title, the cached information can include graphics associated with the title, text associated with the title, and/or any other suitable type of content. As another more particular example, in instances where the webpage is to include indications of available video content items, the cached information can include a thumbnail image associated with each video content item, a title associated with each video content item, and/or any other suitable content. More detailed examples of cached information are described below in connection with block 204 of FIG. 2.

At 104, the user device can transmit an RPC to the server(s) that indicates the webpage being rendered by the user device. For example, in some embodiments, the RPC can indicate a type of webpage corresponding to the webpage being rendered (e.g., a homepage associated with a particular video sharing service or social networking service, a webpage that includes a video player window for presenting a particular video, and/or any other suitable type of webpage). As another example, in some embodiments, in instances where the webpage is a webpage that includes a video player window for presenting a particular video content item, the RPC can include an identifier of the video content item. In some embodiments, the user device can additionally or alternatively transmit one or more RPCs indicating visibilities of objects included in the webpage. For example, in some embodiments, the user device can transmit an RPC that indicates that a portion of the webpage that includes an indication of a particular available video content item has been viewed on the user device (e.g., that the user has scrolled the webpage to make the portion of the webpage visible). As another example, in some embodiments, the user device can transmit an RPC that indicates that an advertisement and/or a promotion included on the webpage has been viewed. As yet another example, in some embodiments, the user device can transmit an RPC that indicates that a particular link has been selected on the user device. More detailed techniques for transmitting the RPC to the server(s) are described below in connection with blocks 208 and 210 of FIG. 2.

At 106, the server(s) can receive the RPC, and can update a viewing log corresponding to the user device based on the received RPC. For example, in some embodiments, the server(s) can update the viewing log to indicate that the user device has presented the webpage being rendered on the user device. As a more particular example, in some embodiments, in instances where the webpage corresponds to a webpage that includes a video player window for presenting a particular video content item, the server can update the viewing log to indicate that the user device is presenting a webpage associated with the particular video content item. As another example, in some embodiments, the server(s) can update the viewing log to indicate objects within the webpage that were visible on the user device and/or that were selected on the user device. As a more particular example, in some embodiments, the server(s) can update the viewing log to indicate that a particular indication of an available video content item became visible on the user device and/or was selected on the user device. As another more particular example, in some embodiments, the server(s) can update the viewing log to indicate that a particular advertisement was visible on the webpage and/or was selected by a user of the user device. More detailed techniques for updating viewing logs are described below in connection with block 306 of FIG. 3.

At 108, the server(s) can determine updated information for the webpage being rendered by the user device. For example, in some embodiments, the server(s) can identify video content items that are to be recommended within the webpage being rendered by the user device. As another example, in some embodiments, the server(s) can identify an advertisement that is to be presented within the webpage being rendered by the user device. In some embodiments, the updated information can be determined based on the viewing logs described above in connection with block 106. For example, in some embodiments, the server(s) can identify video content items that are to be recommended based on objects that have been selected on the user device, as indicated in the viewing logs. More detailed techniques for determining updated information are described below in connection with block 308 of FIG. 3.

At 110, the server(s) can transmit the information to update the webpage being rendered on the user device. In some embodiments, the server(s) can transmit the information in any suitable manner. For example, in some embodiments, the server(s) can transmit the information to update the webpage as a response to the RPC transmitted by the user device, as described above in connection with block 104.

At 112, the user device can update the webpage based on the response received from the server(s). For example, in some embodiments, the user device can update the webpage to indicate video content items identified by the server(s) as recommended video content items. As another example, in some embodiments, the user device can update the webpage to include an advertisement or promotion identified by the server(s). More detailed techniques for updating the webpage are described below in connection with block 210 of FIG. 2.

Figure 2:
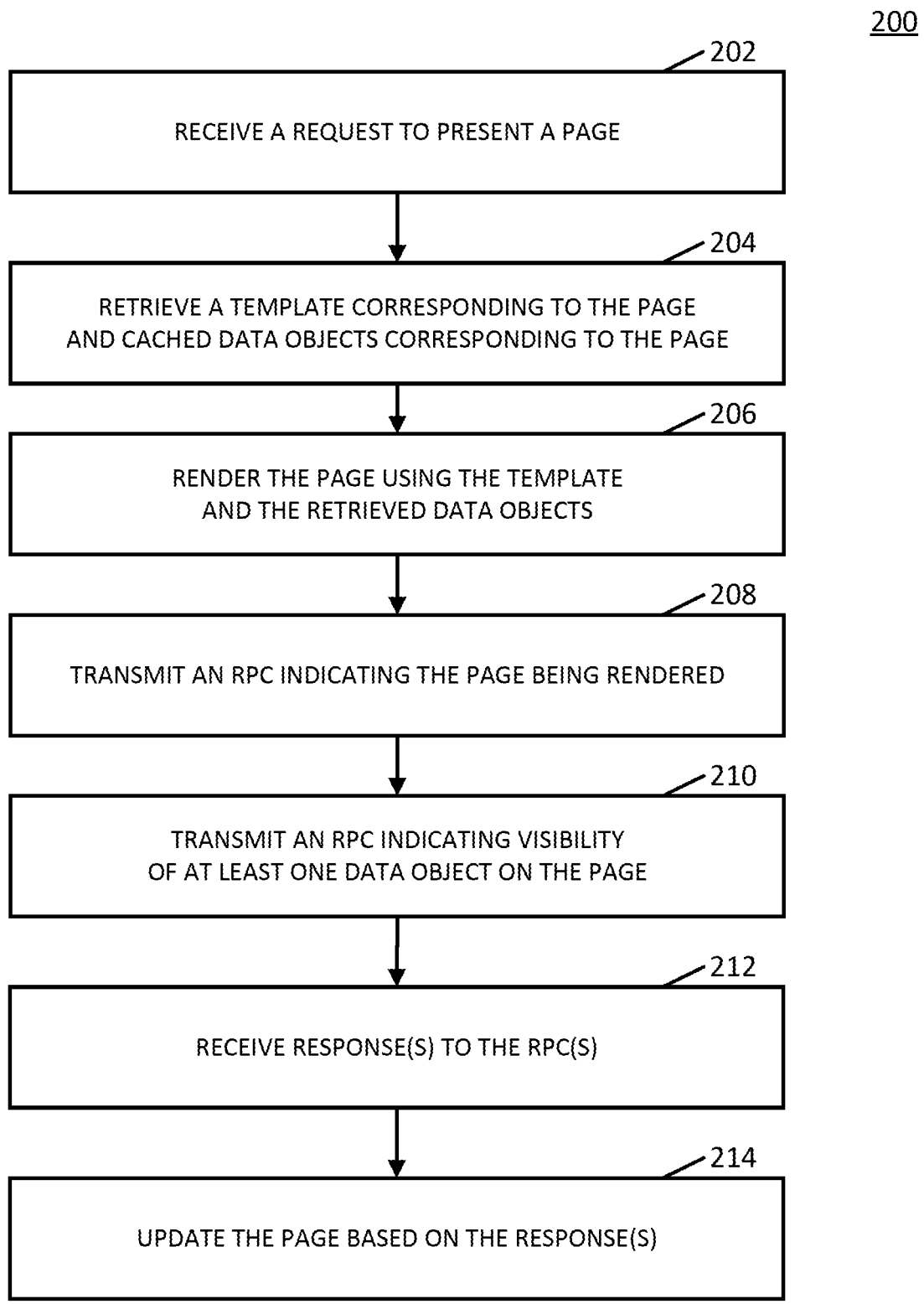
FIG. 2 shows an example of a process for rendering a webpage with cached content and updating the webpage in accordance with some embodiments of the disclosed subject matter.

Turning to FIG. 2, an illustrative example 200 of a process for updating a webpage rendered with cached content is shown in accordance with some embodiments of the disclosed subject matter. In some embodiments, blocks of process 200 can be executed by a user device (e.g., a mobile phone, a tablet computer, a laptop computer, a desktop computer, a media player, and/or any other suitable type of user device).

Process 200 can begin by receiving a request to present a webpage at 202. In some embodiments, the request can be received in any suitable manner. For example, in some embodiments, the request can be received in response to a determination that a user of a user device has navigated to the webpage. As a more particular example, in some embodiments, process 200 can determine that a link corresponding to the webpage has been selected on the user device.

At 204, process 200 can retrieve a template corresponding to the webpage and cached data objects corresponding to the webpage. In some embodiments, process 200 can retrieve a template corresponding to a type of webpage associated with the requested webpage. For example, in instances where the webpage is a homepage for a video sharing service or a social networking service, process 200 can retrieve a template associated with the homepage. As a more particular example, in some embodiments, the template can specify content such as a location of a title for the webpage, a location for a portion of the webpage that is to present recommended content, a location for a portion of the webpage that is to indicate previously viewed content, and/or any other suitable type of information. In some embodiments, types of webpages can include any other suitable types of content, such as a webpage that includes a video player window for viewing a particular video content item, a webpage that allows a user to create a playlist of media content, a webpage that allows a user to manage subscriptions to particular channels of content, a webpage associated with a particular channel of media content on a video sharing service, and/or any other suitable type of content. In some such embodiments, different types of webpages can each be associated with a different template that indicates locations and visual appearances for content that is to appear on that type of webpage. In some embodiments, a template can include information specifying visual appearances for different portions of the webpage, such as a font type and color for a title portion of the webpage, font types and colors for other text on the webpage, sizes of graphics or icons on the webpage, and/or any other suitable type of information.

In some embodiments, the cached data objects can be any suitable content that is to be presented on the webpage that is already stored in memory on the user device. For example, in some embodiments, the cached data objects can include content such as a graphic or icon associated with a title of the webpage, thumbnail images associated with indications of available video content items that are to be presented on the webpage, graphics or icons associated with menus or other user interface controls that are to be presented on the webpage, and/or any other suitable type of content. In some embodiments, the data objects may have been stored in memory on the user device after having been previously presented on the user device. For example, in some embodiments, a data object corresponding to content associated with a title to be presented on a homepage may have been cached after the user device previously displayed the homepage. As another example, in some embodiments, data objects corresponding to indications of recommended video content items (e.g., thumbnail images, titles, and/or any other suitable type of content) may have been cached after the user device previously displayed recommendations for the video content items.

In some embodiments, process 200 can add event listeners to the data objects. For example, in some embodiments, the event listeners can indicate when a particular data object has been made visible on a screen associated with the user device (such as when a user has scrolled the webpage to make the data object visible), when a particular data object has been clicked or selected, when a particular video content item has been endorsed (e.g., liked by a user of the user device, shared with users connected to a user of the user device, and/or endorsed in any other suitable manner), and/or any other suitable type of event. In some embodiments, process 200 can add the event listeners in any suitable manner (e.g., in JAVASCRIPT code associated with the template and/or the webpage, and/or in any other suitable manner). In some embodiments, the event listeners can be controlled by a controller associated with the template, which can detect when an event listener associated with a particular data object has fired and perform a corresponding action (e.g., transmitting an RPC to a server indicating the detected event, as described below in connection with block 208).

Note that, in some embodiments, process 200 can store indications of the detected events in memory on the user device in any suitable manner. For example, in some embodiments, process 200 can store indications of the detected events that include information such as an identifier of the data object, an identifier of the webpage the event occurred within (e.g., the webpage currently being rendered on the user device), the type of event (e.g., the data object became visible within the webpage, the data object was selected, and/or any other suitable type of event), timing information associated with the event (e.g., an index value, as described below in connection with block 208, a timestamp, and/or any other suitable timing information), and/or any other suitable information.

At 206, process 200 can render the requested webpage using the template and the cached data objects. For example, in some embodiments, process 200 can cause a webpage to be presented on the user device that includes portions of the webpage corresponding to portions specified in the template. As a more particular example, the portions of the webpage can include a title portion, a portion that indicates recommended video content, a portion that indicates content recently viewed on the user device, a settings interface that allows a user to manage settings associated with a particular user account, and/or any other suitable portions. Process 200 can then cause the cached data objects to be rendered at locations specified in the template. For example, in instances where the template includes a title portion and the cached data objects include a graphic or icon associated with a title of the webpage, process 200 can cause the graphic or icon to be presented in a location and size specified by the template. As another example, in instances where the template includes a portion of the webpage for recommended video content items to a user that includes indications of the recommended video content items, process 200 can cause cached data objects corresponding to the video content items to be recommended (e.g., thumbnail images, titles, names of creators, and/or any other suitable type of content) to be presented in locations and sizes specified by the template. Note that, in instances where a data object has not been cached (e.g., in an instance where the user device has not previously presented a particular data object), process 200 can render the webpage with a portion of the webpage corresponding to a data object that has not yet been cached blank, and can request the data object from a server associated with the webpage, as described below in more detail in connection with block 208.

Process 200 can transmit an RPC indicating the webpage being rendered to a server associated with the webpage at 208. In some embodiments, the RPC can include any suitable information, such as an identifier of the webpage. For example, in some embodiments, the RPC can indicate that a homepage associated with a particular video sharing service or social networking service is being presented on the user device, that a webpage for presenting a particular video content item is being presented on the user device, that a webpage that allows a user to create a playlist of media content items is being presented on the user device, and/or any other suitable webpage. As a more particular example, in an instance where the webpage is a webpage associated with presentation of a particular video content item, the RPC can indicate the particular video content item, as well as any other suitable information, such as a playlist that includes the particular video content item, related video content items that are known by the user device (e.g., video content items related to the particular video content item for which data objects are already cached on the user device, and/or any other suitable related video content items), and/or any other suitable information. In some embodiments, the RPC can additionally include an indication of the template being used to render the webpage. In some embodiments, the RPC can include identifiers of data objects that have been rendered within the webpage. For example, in some embodiments, the RPC can include identifiers of video content items that have been presented as recommendations, and/or any other suitable type of identifiers corresponding to data objects in the webpage. In some embodiments, the RPC can include indications of portions of the webpage that have been left blank because no cached data object exists on the user device corresponding to the blank portion. For example, in instances where a template associated with the webpage specifies that indications of recommended video content items are to be included in the webpage but that no data objects corresponding to recommended video content items have been cached on the user device, the RPC can indicate that additional content is needed for the recommended content portion of the webpage.

Process 200 can transmit an RPC indicating visibility events associated with data objects rendered in the webpage to the server at 210. For example, in some embodiments, in an instance where an event listener associated with a particular data object detects a particular visibility event corresponding to the data object (e.g., that the data object has become visible within the webpage, that the data object has been selected, that a user has engaged with a particular content item by endorsing it, that a user has viewed a particular video content item, and/or any other suitable event), process 200 can cause an RPC that indicates the event to be transmitted to the server. In some embodiments, the RPC can include any suitable information that indicates timing of the detected events. For example, in some embodiments, the RPC can include an index number that is increased with each detected event, thereby indicating timing of events to the server. Note that, in some embodiments, process 200 can transmit any suitable number of RPCs indicating visibility events and at any suitable frequency. For example, in some embodiments, process 200 can transmit an RPC for each detected visibility event. Additionally, in some embodiments, multiple RPCs can be transmitted for one data object. For example, in some embodiments, process 200 can transmit a first RPC (e.g., with index=1, and/or any other suitable index value) indicating that a data object has become visible within the webpage. Continuing with this example, process 200 can subsequently transmit a second RPC (e.g., with index=2, and/or any other suitable index value) indicating that the data object has been selected on the user device.

Note that, in some embodiments, the RPCs transmitted at blocks 208 and 210 can be transmitted in any suitable manner. For example, in some embodiments, the RPCs can be transmitted to the server as non-blocking RPCs, thereby allowing process 200 to continue executing while waiting for responses from the server.

At 212, process 200 can receive responses from the server to the RPC(s) transmitted at blocks 208 and 210. Note that, in some embodiments, any suitable number of responses can be received (e.g., a response corresponding to each RPC transmitted in blocks 208 and/or 210), and the responses can be received with any suitable timing. For example, in some embodiments, a response to an RPC indicating the webpage currently being rendered on the user device can be received before a response to an RPC indicating that a particular data object has been selected. In some embodiments, the received responses can include any suitable information. For example, in some embodiments, a response to an RPC indicating the webpage currently being rendered on the user device can include identifiers for video content items to be recommended based on the webpage currently being rendered, an indication of an advertisement to be presented on the webpage currently being rendered, and/or any other suitable information. In some embodiments, the response can additionally or alternatively include any suitable content that is to be used to update the webpage, such as text, images, graphics, icons, and/or any other suitable type of content. For example, in instances where the response includes an indication of a video content item that is to be recommended on the webpage currently being rendered, the response can additionally include a thumbnail image associated with the video content item, a name of the video content item, a link to the video content item, a name of a creator of the video content item, and/or any other suitable information. As another example, a response to an RPC indicating that a data object corresponding to a recommended video content item was selected within the webpage can include information indicating that the video content item is no longer to be recommended on the webpage (because it has already been selected on the webpage), identifiers of video content items related to the selected video content item that are to be recommended, and/or any other suitable information. Note that, more detailed techniques describing the received responses are described below in connection with FIG. 3.

At 214, process 200 can update the webpage rendered on the user device at block 206 using the response(s) received to the RPC(s) at block 212. For example, in instances where a response includes an indication of a video content item that is to be presented as a recommended video content item (e.g., in a portion of the webpage that includes recommended content, and/or in any other suitable manner), process 200 can update the webpage to include a recommendation for the video content item indicated in the response. As a more particular example, in some embodiments, process 200 can update the webpage to include a thumbnail image included in the response, a title of the video content item included in the response, a name of a creator of the video content item included in the response, and/or any other suitable content. As another example, in instances where a response includes an indication of an advertisement that is to be presented on the webpage, process 200 can update the webpage to include the indicated advertisement. As yet another example, in instances where a response includes an instruction to update an indication of a particular video content item included in the webpage as already watched or already endorsed (e.g., liked by a user of the user device, shared with other users, and/or any other suitable type of endorsement) by a user of the user device, process 200 can cause the indication of the particular video content item to be updated to reflect that the video content item has already been watched and/or endorsed. As a more particular example, in some embodiments, process 200 can cause a tag or banner to be applied to a thumbnail image representing the video content item indicating that it has already been watched on the user device. As another more particular example, in some embodiments, process 200 can cause the video content item to be highlighted in any suitable manner to indicate it has been endorsed by a user of the user device.

Note that, in some embodiments, process 200 can update the webpage based on the template described above in connection with block 204. For example, in some embodiments, process 200 can render content included in the response and/or indicated in the response at locations specified by the template (e.g., place a thumbnail image of a video content item to be recommended in a location specified in the template, and/or in any other suitable location). As another example, in some embodiments, a controller associated with the template can determine whether the response is related to a particular data object included in the webpage, and can update content related to the particular data object. As a more particular example, in instances where the response indicates that a particular indication of a video content item is to indicate that a user of the user device has already watched the video content item, a controller associated with the template can identify the data object associated with the response, and can cause the identified data object to be modified (e.g., adding a tag to the video content item that indicates it has already been watched, and/or any other suitable update).

Figure 3:
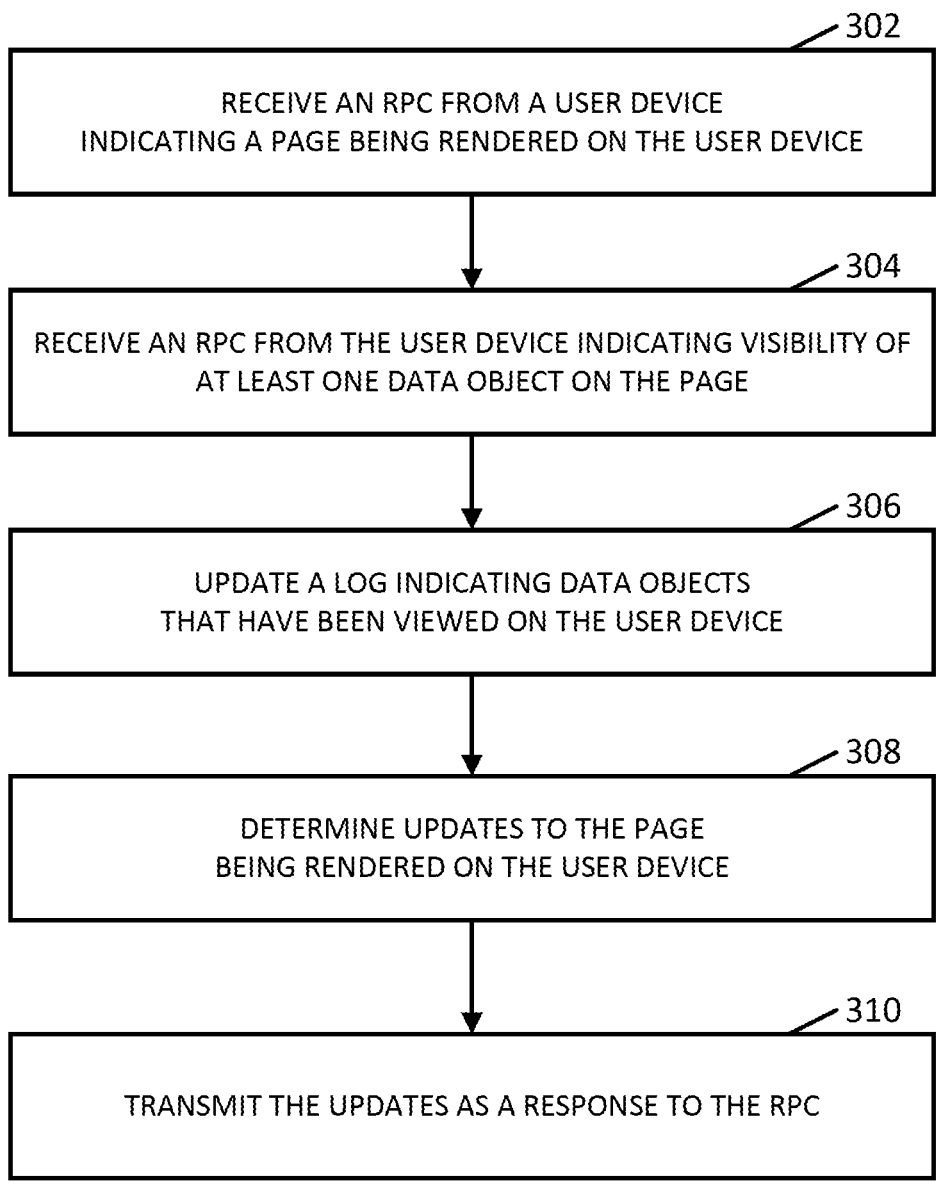
FIG. 3 shows an example of a process for transmitting updates for a rendered webpage in accordance with some embodiments of the disclosed subject matter.

Turning to FIG. 3, an illustrative example 300 of a process for transmitting information to update a webpage rendered on a user device is shown in accordance with some embodiments of the disclosed subject matter. In some embodiments, blocks of process 300 can be executed on a server, such as a server associated with the webpage rendered on the user device and/or with content included on the webpage rendered on the user device.

Process 300 can begin by receiving an RPC from a user device that indicates a webpage being rendered on the user device at 302. For example, as described above in connection with block 208, the RPC can include an identifier of the webpage being rendered. As a more particular example, in some embodiments, the RPC can indicate that a homepage associated with a video sharing service or social networking service is being presented, that a webpage for presenting a particular video content item is being presented, that a webpage that allows a user to create a playlist is being presented, that a webpage associated with a particular channel of video content is being presented, and/or that any other suitable webpage is being presented. Additionally, as described above in connection with block 208 of FIG. 2, the RPC can include indications of data objects included in the webpage. For example, in some embodiments, the RPC can include indications of video content items that have been recommended within the webpage, indications of advertisements on the webpage, and/or any other suitable information associated with data objects included in the webpage. As a more particular example, in some embodiments, the RPC can include indications of the cached content that is being used by the user device to render the webpage.

At 304, process 300 can receive an RPC from the user device indicating a visibility event associated with a data object included in the webpage. For example, as described above in connection with block 210 of FIG. 2, the RPC can include an indication that a particular data object has become visible within the webpage (e.g., as a result of a user of the user device scrolling to make a previously invisible data object visible), that a particular data object has been selected, and/or any other suitable visibility event. In some embodiments, the RPC can include any suitable timing information. For example, as described above in connection with block 208 of FIG. 2, the RPC can include an index value that indicates an order in which visibility events are detected on the user device. As a more particular example, in some embodiments, higher index values can indicate more recent events. As another example, in some embodiments, the timing information can include any other suitable indication, such as a timestamp associated with a detected visibility event. Note that, in some instances, visibility events may not be detected by the user device, and, in such instances, block 304 can be omitted.

Process 300 can update a log indicating the webpage being rendered on the user device and/or a visibility event associated with a data object at 306. For example, in some embodiments, process 300 can update the log to indicate that the webpage being rendered on the user device is a webpage associated with a particular video content item (e.g., a webpage that includes a video player window to present the particular video content item, and/or any other suitable type of webpage), and that the particular video content item has therefore been viewed on the user device. As another example, in some embodiments, process 300 can update the log to include indications of data objects that are being presented on the webpage. As a more particular example, in some embodiments, process 300 can update the log to include indications of video content items that were included as recommended video content items on the webpage. As another more particular example, in some embodiments, process 300 can update the log to include an indication of a particular advertisement that was presented on the webpage. As yet another example, in some embodiments, process 300 can update the log to indicate that a particular data object (e.g., a recommendation of a particular video content item, a particular advertisement, and/or any other suitable type of data object) has been selected on the user device. As still another example, in some embodiments, process 300 can update the log to indicate that a particular data object (e.g., a recommendation of a particular video content item, a particular advertisement, and/or any other suitable type of data object) has become visible on the user device but has not been selected.

Note that, in some embodiments, process 300 can store the log information in any suitable manner. For example, in some embodiments, the log information can be stored as a tree. As a more particular example, in some embodiments, a first parent node of a tree can indicate a webpage viewed on the user device, and a second child node of the tree can indicate a data object presented within the webpage (e.g., an advertisement, a recommendation for a particular video content item, and/or any other suitable type of data object) on the user device. In some such embodiments, a node can be updated to indicate that a data object associated with the node has been selected, and/or any other suitable information.

Additionally, note that, in instances where process 300 receives multiple RPCs indicating visibility events for a single data object, process 300 can remove previously received event indications from the log information and keep only a most recently received event indication. For example, in instances where process 300 receives a first RPC indicating that a particular data object (e.g., a recommendation to view a particular video content item, an advertisement, and/or any other suitable data object) has become visible on the webpage, and a subsequent, second RPC indicating that the data object has been selected, process 300 can remove the indication that the data object has become visible. In some embodiments, process 300 can determine an order in which the multiple RPCs were received for the data object using timing information included in the RPC, such as an index value included in the RPC, as described above in connection with block 304 of FIG. 3.

Process 300 can determine one or more updates to the webpage being rendered on the user device at 308. In some embodiments, the one or more updates to the webpage can include any suitable type of information. For example, in some embodiments, the one or more updates can include video content items that are to be presented as recommendations within the webpage being rendered on the user device (e.g., in a portion of the webpage for recommended content, and/or any other suitable portion of the webpage). As another example, in some embodiments, the one or more updates can include an advertisement that is to be included in the webpage. As yet another example, in some embodiments, the one or more updates can include a tag that is to be added to an indication of a video content item indicating that the video content item has already been viewed on the user device and/or has been endorsed by a user of the user device.

In some embodiments, process 300 can determine the one or more updates based on any suitable information and using any suitable technique(s). For example, in some embodiments, process 300 can determine the one or more updates based on the log information that indicates content on the webpage being viewed and/or data objects that have been selected on the user device. As a more particular example, in instances where the log information indicates that the webpage being viewed is a webpage associated with a particular video content item, process 300 can identify one or more video content items related to the particular video content item that are to be included as recommended video content items on the webpage. As another example, in instances where the log information indicates that the webpage being viewed is a webpage associated with a particular video content item, process 300 can identify an advertisement to be included in the webpage based on a topic or genre of the particular video content item. As yet another example, in instances where the log information indicates that a particular video content item has been viewed on the user device, process 300 can determine that a tag is to be added to a data object (e.g., a thumbnail image, and/or any other suitable type of data object) associated with the video content item indicating that the video content item has been viewed. As still another example, in instances where the log information indicates that a particular video content item has been endorsed by a user of the user device (e.g., liked by the user, shared with other users connected to the user on a social networking service, and/or endorsed in any other suitable manner), process 300 can determine that a tag is to be added to a data object (e.g., a thumbnail image, an icon, and/or any other suitable type of data object) associated with the video content item indicating that the video content item has been endorsed by the user of the user device.

Note that, in some embodiments, process 300 can identify the one or more updates using log information from any suitable time period, such as previous viewing sessions (e.g., sessions not associated with the RPCs received at blocks 302 and/or 304, and/or any other suitable previous viewing sessions). For example, in some embodiments, process 300 can identify the one or more updates based on previously viewed webpages, previously viewed video content items, previously viewed advertisements, and/or any other suitable content indicated as previously presented on the user device in the log information.

In some embodiments, process 300 can use the log information to determine one or more content items that are not to be included in the updates. For example, in instances where process 300 identifies a particular video content item as likely to be of interest to a user of the user device based on the log information (e.g., based on a determination that the particular video content item is similar to other previously viewed video content items, and/or based on any other suitable determination), process 300 can determine whether the particular video content item has already been viewed on the user device based on the log information. Continuing with this example, in instances where process 300 determines that the particular video content item has already been viewed on the user device, process 300 can determine that a recommendation to view the particular video content item is not to be included in the one or more updates to the webpage. As another example, in instances where process 300 identifies a particular video content item as likely to be of interest to a user of the user device based on the log information, process 300 can determine whether a recommendation to view the video content item has already been presented and/or is currently being presented on the webpage based on the log information. Continuing with this example, in instances where process 300 determines that a recommendation to view the particular video content item has already been presented and/or is currently being presented, process 300 can determine that a recommendation to view the particular video content item is not to be included in the one or more updates to the webpage.

Note that, in some embodiments, process 300 can use the log information and/or information included in the RPCs received at blocks 302 and/or 304 to de-duplicate data objects that appear in the one or more updates and data objects that are included in the webpage being rendered on the user device. For example, in some embodiments, process 300 can remove any data objects included in the one or more updates to the webpage that process 300 determines are currently being presented on the webpage (e.g., based on information included in the RPCs received at blocks 302 and/or 304, based on the log information, and/or based on any other suitable information). As a more particular example, in instances where the one or more updates include a recommendation to view a particular video content item, process 300 can remove data objects (e.g., thumbnail images, a title, and/or any other suitable type of data object) associated with the particular video content item from the one or more updates to the webpage in response to determining that the webpage currently includes a recommendation to view the particular video content item.

Process 300 can transmit the one or more updates to the user device at 310. In some embodiments, process 300 can transmit the one or more updates to the user device using any suitable technique or combination of techniques. For example, in some embodiments, process 300 can transmit the one or more updates to the user device as a response to the RPC received at block 302 indicating a webpage currently being presented on the user device. In some embodiments, the one or more updates can include any suitable content, such as graphics, images, icons, links, text, and/or any other suitable content that are to be included in each update. For example, in instances where an update to the webpage is a recommendation to view a particular video content item, the update can include a thumbnail image associated with the video content item, a link to the video content item, text indicating a title of the video content item, text indicating a name of a creator of the video content item, and/or any other suitable content.

Note that, in some embodiment, process 300 can transmit any other suitable information as a response to the RPC(s). For example, in some embodiments, process 300 can determine webpages likely to be viewed after the webpage currently being rendered on the user device, and can transmit content to be included in a webpage likely to be viewed next. As a more particular example, in instances where process 300 determines that a webpage associated with a particular channel of content is likely to be viewed soon (e.g., as a next webpage, within the next few minutes, and/or within any other suitable time period), process 300 can identify video content items associated with the channel of content and can transmit content (e.g., thumbnail images representing the video content items, titles of the video content items, and/or any other suitable content) that can be used by the user device to render indications of the video content items within a webpage associated with the channel when it is requested on the user device.

Figure 4:
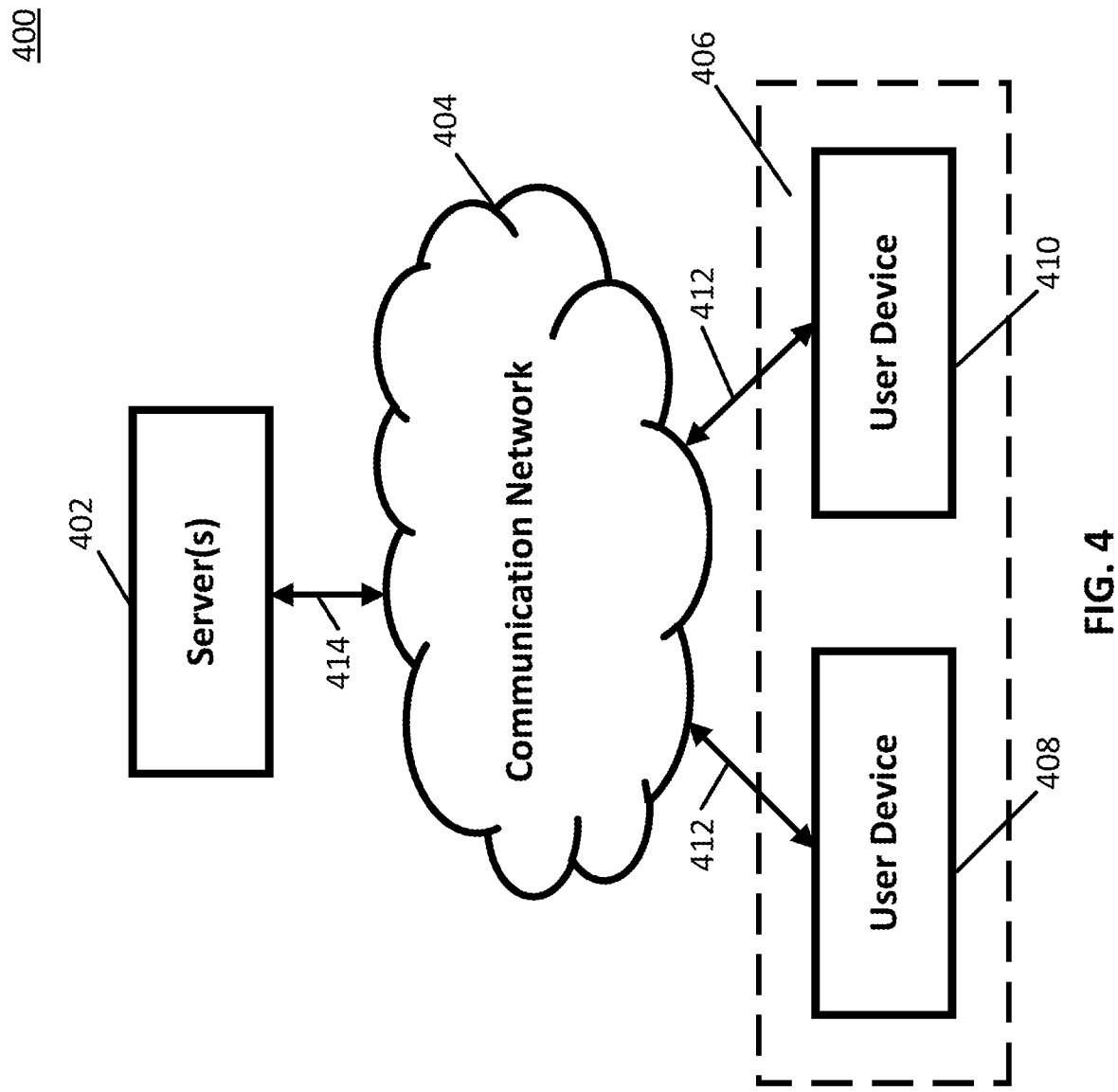
FIG. 4 shows a schematic diagram of an illustrative system suitable for implementation of mechanisms described herein for updating webpage content in accordance with some embodiments of the disclosed subject matter.

Turning to FIG. 4, an example 400 of hardware for updating a webpage rendered with cached content that can be used in accordance with some embodiments of the disclosed subject matter is shown. As illustrated, hardware 400 can include server(s) 402, a communication network 404, and/or one or more user devices 406, such as user devices 408 and 410.

Server(s) 402 can be any suitable server(s) for storing and/or providing media content to user devices 406. For example, in some embodiments, server(s) 402 can store media content, such as videos, television programs, movies, live-streamed media content, audio content, animations, video game content, graphics, and/or any other suitable media content. In some embodiments, server(s) 402 can transmit media content to user devices 406, for example, via communication network 404. In some embodiments, server(s) 402 can transmit updates to user device 406 for a webpage being rendered on user device 406 in response to receiving an RPC from user device 406, as shown in and described above in more detail in connection with FIGS. 1 and 3.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server(s) 402. The communications links can be any communications links suitable for communicating data among user devices 406 and server(s) 402 such as network links, dial-up links, wireless links, hard-wired links, any other suitable communications links, or any suitable combination of such links.

User devices 406 can include any one or more user devices suitable for requesting a webpage that includes indications of available media content, rendering the webpage using cached content, updating the rendered webpage based on updated information provided by server(s) 402, and/or for performing any other suitable functions. For example, in some embodiments, user devices 406 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 406 can include a media playback device, such as a television, a projector device, a game console, desktop computer, and/or any other suitable non-mobile device.

Although server(s) 402 is illustrated as one device, the functions performed by server(s) 402 can be performed using any suitable number of devices in some embodiments. For example, in some embodiments, multiple devices can be used to implement the functions performed by server(s) 402.

Although two user devices 408 and 410 are shown in FIG. 4 to avoid over-complicating the figure, any suitable number of user devices, and/or any suitable types of user devices, can be used in some embodiments.

Figure 5:
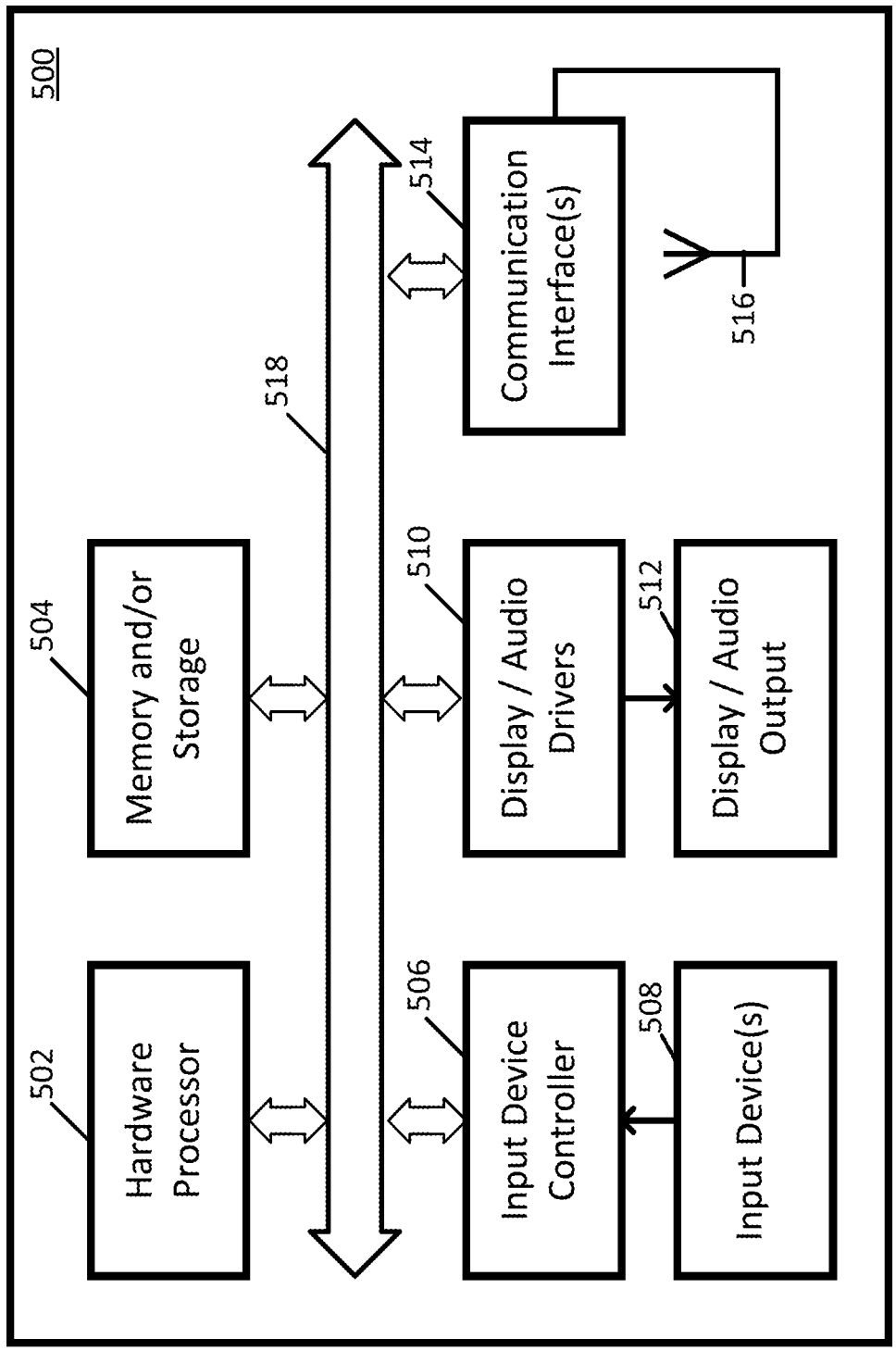
FIG. 5 shows a detailed example of hardware that can be used in a server and/or a user device of FIG. 4 in accordance with some embodiments of the disclosed subject matter.

Server(s) 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage 504 of a server (e.g., such as server(s) 402). For example, in some embodiments, the server program can cause hardware processor 502 to receive an indication of a webpage being presented on a user device, determine updates to the webpage, transmit the updates to the user device, and/or perform any other suitable actions. In some embodiments, hardware processor 502 can be controlled by a computer program stored in memory and/or storage 504 of user device 506. For example, the computer program can cause hardware processor 502 to render a webpage using cached information, transmit an indication of the webpage to server(s) 402, receive updates to the webpage, update the webpage, and/or perform any other suitable actions.

Memory and/or storage 504 can be any suitable memory and/or storage for storing programs, data, media content, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for updating a webpage rendered with cached content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for updating webpage content, the method comprising:
   receiving, at a user device, a request to present a webpage;
   retrieving, from memory local to the user device, a template associated with the webpage and a plurality of content items to be included in the webpage;
   causing the webpage to be presented on the user device using the retrieved template and the plurality of content items, wherein at least one content item of the plurality of content items is associated with an event listener that detects an activity associated with the at least one content item, and wherein a portion of the webpage that corresponds to a first content item that was not retrieved from the memory local to the user device is presented as blank;
   in response to detecting the activity associated with the at least one content item using the event listener, transmitting a Remote Procedure Call (RPC) to a server associated with the webpage, wherein the RPC includes indications of a visibility event associated with a second content item included in the webpage and the portion of the webpage that is blank as the first content item was not stored in the memory location to the user device;
   receiving a response to the RPC that includes at least one update to the webpage; and
   causing the webpage to be updated based on the response to the RPC.

2. The method of claim 1, wherein the at least one update to the webpage includes a content item not included in the plurality of content items.

3. The method of claim 1, wherein at least one content item in the plurality of content items is a recommendation to view a media content item.

4. The method of claim 1, wherein the RPC includes identifiers corresponding to each of the content items in the one or more content items.

5. The method of claim 1, wherein the activity comprises detecting that the at least one content item of the plurality of content items has been interacted with on the user device.

6. The method of claim 5, wherein the RPC includes timing information of the interaction with the content item of the plurality of content items.

7. The method of claim 1, wherein the template indicates a location for each content item in the plurality of content items.

8. A system for updating webpage content, the system comprising:
   a memory; and
   a hardware processor that, when executing computer-executable instructions stored in the memory, is configured to:
      receive, at a user device, a request to present a webpage;
      retrieve, from memory local to the user device, a template associated with the webpage and a plurality of content items to be included in the webpage;

cause the webpage to be presented on the user device using the retrieved template and the plurality of content items, wherein at least one content item of the plurality of content items is associated with an event listener that detects an activity associated with the at least one content item, and wherein a portion of the webpage that corresponds to a first content item that was not retrieved from the memory local to the user device is presented as blank;

in response to detecting the activity associated with the at least one content item using the event listener, transmit a Remote Procedure Call (RPC) to a server associated with the webpage, wherein the RPC includes indications of a visibility event associated with a second content item included in the webpage and the portion of the webpage that is blank as the first content item was not stored in the memory location to the user device;

receive a response to the RPC that includes at least one update to the webpage; and cause the webpage to be updated based on the response to the RPC.

9. The system of claim 8, wherein the at least one update to the webpage includes a content item not included in the plurality of content items.

10. The system of claim 8, wherein at least one content item in the plurality of content items is a recommendation to view a media content item.

11. The system of claim 8, wherein the RPC includes identifiers corresponding to each of the content items in the one or more content items.

12. The system of claim 8, wherein the activity comprises detecting that the at least one content item of the plurality of content items has been interacted with on the user device.

13. The system of claim 12, wherein the RPC includes timing information of the interaction with the content item of the plurality of content items.

14. The system of claim 8, wherein the template indicates a location for each content item in the plurality of content items.

15. A non-transitory computer-readable medium containing computer-executable instructions that, when executed by a processor, cause the processor to perform a method for updating webpage content, the method comprising:

receiving, at a user device, a request to present a webpage;

retrieving, from memory local to the user device, a template associated with the webpage and a plurality of content items to be included in the webpage;

causing the webpage to be presented on the user device using the retrieved template and the plurality of content items, wherein at least one content item of the plurality of content items is associated with an event listener that detects an activity associated with the at least one content item, and wherein a portion of the webpage that corresponds to a first content item that was not retrieved from the memory local to the user device is presented as blank;

in response to detecting the activity associated with the at least one content item using the event listener, transmitting a Remote Procedure Call (RPC) to a server associated with the webpage, wherein the RPC includes indications of a visibility event associated with a second content item included in the webpage and the portion of the webpage that is blank as the first content item was not stored in the memory location to the user device;

receiving a response to the RPC that includes at least one update to the webpage; and causing the webpage to be updated based on the response to the RPC.

16. The non-transitory computer-readable medium of claim 15, wherein the at least one update to the webpage includes a content item not included in the plurality of content items.

17. The non-transitory computer-readable medium of claim 15, wherein at least one content item in the plurality of content items is a recommendation to view a media content item.

18. The non-transitory computer-readable medium of claim 15, wherein the RPC includes identifiers corresponding to each of the content items in the one or more content items.

19. The non-transitory computer-readable medium of claim 15, wherein the activity comprises detecting that the at least one content item of the plurality of content items has been interacted with on the user device.

20. The non-transitory computer-readable medium of claim 19, wherein the RPC includes timing information of the interaction with the content item of the plurality of content items.

21. The non-transitory computer-readable medium of claim 15, wherein the template indicates a location for each content item in the plurality of content items.

* * * * *